United States Patent
Dunleavy et al.

(10) Patent No.: US 6,478,913 B1
(45) Date of Patent: Nov. 12, 2002

(54) METHOD FOR MANUFACTURING A FILLED HOLLOW FIBRE COMPOSITE MATERIAL

(75) Inventors: Michael Dunleavy, Bishopston (GB); Christopher Somerton, Charfield (GB); Jennifer Hudd, Hanham (GB); Sajad Haq, Glasgow (GB)

(73) Assignee: Bae Systems PLC, Farnborough (GB)

(*) Notice: Subject to any disclaimer, the term of this patent is extended or adjusted under 35 U.S.C. 154(b) by 155 days.

(21) Appl. No.: 09/622,404

(22) PCT Filed: Jun. 29, 2000

(86) PCT No.: PCT/GB00/02506

§ 371 (c)(1),
(2), (4) Date: Aug. 17, 2000

(87) PCT Pub. No.: WO01/03910

PCT Pub. Date: Jan. 18, 2001

(30) Foreign Application Priority Data

Jul. 10, 1999 (GB) .............................................. 9916157

(51) Int. Cl.[7] .......................... B29C 67/14; B32B 27/04
(52) U.S. Cl. ...................... 156/153; 156/180; 156/344; 156/289; 156/281
(58) Field of Search ................................ 156/247, 180, 156/181, 304.1, 294, 344, 389, 250, 267, 246, 89.22, 254, 187, 197, 289, 296, 153, 154; 428/398, 91, 96; 244/118.1, 118.2, 117, 119, 123

(56) References Cited

U.S. PATENT DOCUMENTS

| 4,548,664 A | * 10/1985 | Canviet .................... 156/166 |
| 4,851,065 A | * 7/1989 | Curtz ....................... 156/72 |
| 5,032,269 A | * 7/1991 | Wollbeck et al. ........ 210/321.8 |

FOREIGN PATENT DOCUMENTS

| DE | 4107618 | * 3/1991 | ........... B29C/67/14 |
| DE | 41 07 617 A | 9/1992 | |
| JP | 010225533 A | 9/1989 | |
| JP | 4-310222 | * 11/1992 | ........... B01D/69/08 |
| JP | 050050523 A | 3/1993 | |

* cited by examiner

Primary Examiner—Jeff H. Aftergut
Assistant Examiner—Vivek Koppikar
(74) Attorney, Agent, or Firm—Nixon & Vanderhye P.C.

(57) ABSTRACT

A filled hollow fibre composite material is made by laying up a plurality of prepreg plies (1) of hollow fibre composite material and non-stick film material (2) one on top of another with the non-stick film material (2) interleaving successive plies (1) at selected areas thereof. The laid up interleaved plies are treated to resin bond the ply areas (3) not interleaved with the non-stick film material and leave the interleaved areas (4) unbonded. The so formed laminate is treated at edge regions to expose open unfilled hollow fibre ends (5, 6) and the plies in the unbonded interleaved areas (4) are separated at the non-stick film material (2) to provide access to the open hollow fibre ends (7) in each ply for the introduction of a film material into the hollow fibres through the open hollow fibre ends (7) in one or more of the separated plies (1) to form a filled hollow fibre composite material.

11 Claims, 1 Drawing Sheet

METHOD FOR MANUFACTURING A FILLED HOLLOW FIBRE COMPOSITE MATERIAL

Figure 1:
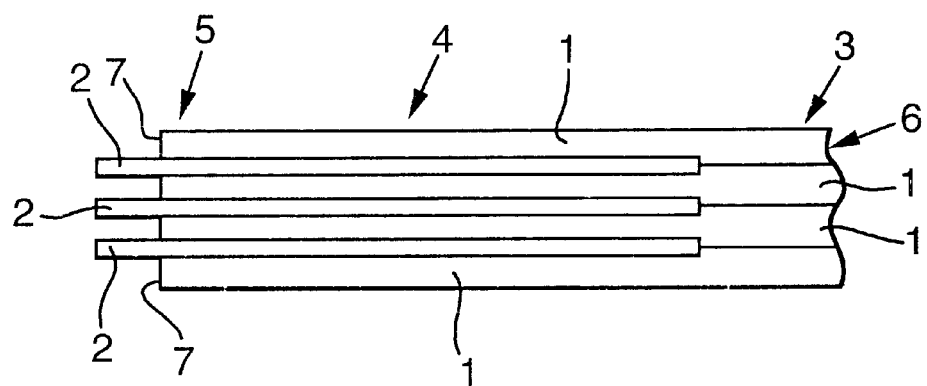

This invention relates to a method for manufacturing a filled hollow fibre composite material and to a material made by the method.

Hollow fibre glass composite materials have been proposed which can be fabricated using prepreg hollow fibre material. The properties of such a composite material can be altered by filling the hollow fibres with a suitable material. It has been proposed that the hollow fibres of individual hollow fibre composite material plies be filled before the plies are made up one upon the other, which laid up plies are then treated in an autoclave at high pressure and high temperature. This exposure to high pressure and high temperature could degrade the filling in the hollow fibres which would be detrimental to the properties of the resulting composite material particularly if the filling material in hollow fibres in different plies in the prepreg lay-up is different with different resistance or tolerance for high temperature and high pressure conditions. This can result in an uneven deterioration through the thickness of the resulting composite material which could give rise to a product of uncertain properties.

There is thus a need for a generally improved method for manufacturing a filled fibre composite material which minimises deterioration during the manufacturing process of the materials utilised in the composite material and hence minimises undesirable variation in the resulting product.

According to a first aspect of the present invention there is provided a method for manufacturing a filled hollow fibre composite material including the steps of:

laying up a plurality of prepreg plies of hollow fibre composite material and non-stick film material one on top of another with the non-stick film material interleaving successive plies at selected areas thereof, treating the laid up interleaved plies to resin bond together the ply areas not interleaved with the non-stick film material to form a hollow fibre composite material laminate in which the interleaved areas remain unbonded together, treating edge regions of the laminate to expose open unfilled hollow fibre ends, separating the plies at the non-stick film material in the unbonded interleaved areas to provide access to the open hollow fibre ends in each ply and, introducing a film material or materials having desired properties different from that of the hollow fibre material, into the hollow fibres through the open hollow fibre ends in one or more of the separated plies in the unbonded interleaved areas to form a filled hollow fibre composite material.

Preferably the resin bonding treatment step is effected in an autoclave.

Conveniently the laminate edge region treatment step includes dry cutting off edge regions of the laminate in both unbonded interleaved areas and bonded areas to remove hollow fibre ends filled with resin during resin bonding to leave cut edges on laminate exposing unfilled hollow fibre ends, grinding and polishing the laminate cut edges in a liquid coolant to remove resin smeared over the open unfilled hollow fibre ends by the dry cutting, ultrasonically cleaning the ground and polished laminate cut edges and there with the open unfilled hollow fibre ends, in a liquid solvent and drying the cleaned laminate cut edges.

Advantageously the hollow fibre composite material utilised is a resin bonded ply of hollow glass or carbon fibres.

Preferably the non-stick film material utilised is a sheet of plastics material coated with a release agent.

Conveniently the filler material utilised is in liquid powder and/or particulate form.

Advantageously grinding and polishing is carried out with silicon carbide paper.

Preferably the liquid coolant utilised in grinding and polishing is water.

Conveniently the liquid solvent utilised in ultrasonic cleaning is dichloromethane.

Advantageously ultrasonic cleaning is carried out for substantially two hours.

Preferably drying is carried out at substantially 90° C. for substantially ten minutes.

Figure 2:
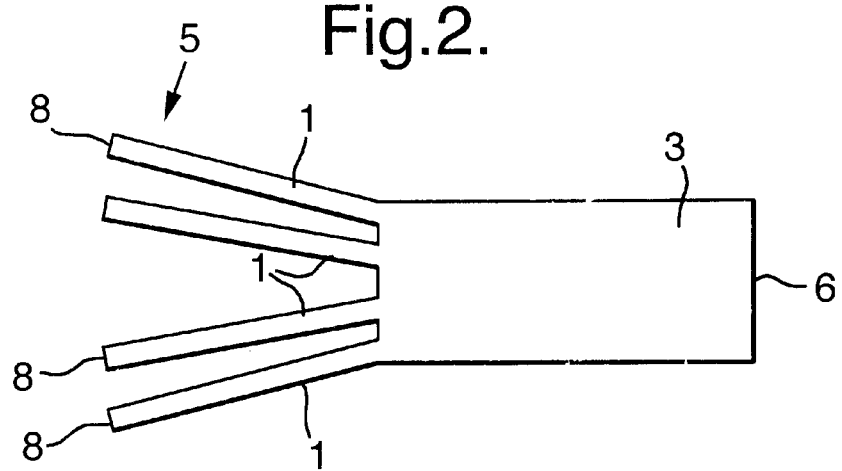

For a better understanding of the present invention, and to show how the same may be carried into effect, reference will now be made, by way of example, to the accompanying drawings, in which;

FIG. 1 is a schematic side elevational view of a lay-up of a plurality of prepreg plies of hollow fibre composite material and non-stick film material according to the present invention and FIG. 2 is a side elevational view, to a different scale from that of FIG. 1, showing a laminate of prepreg plies after resin bonding with the plies being separated at one area at the non-stick film material, according to the present invention.

It has been proposed to fabricate hollow fibre glass composites using hollow fibre glass material prefilled with a material having different characteristics from the material from which the fibre is made. A plurality of prepreg plies of the filled hollow fibre material is laid up and resin bonded in an autoclave under high pressure and high temperature. This autoclave resin bonding can have deleterious effects on the properties of the material filled in the hollow fibres.

These problems are overcome in the method of the present invention for manufacturing a filled hollow fibre composite material in which a plurality of prepreg plies 1, of hollow fibre composite material, such as a resin bonded ply of hollow glass or carbon fibres, and non-stick film material 2 such as sheets of plastics material coated with a release agent, are made up one on top of another as shown in FIG. 1 of the accompanying drawings, with the non-stick film material 2 interleaving successive plies 1 at selected areas there. FIG. 1 shows such a selected area. The laid up interleaved plies 1 are treated to resin bond together the ply areas 3 not interleaved with the non-stick film material 2 to form a hollow composite fibre material laminate in which the interleaved areas generally referenced 4 in FIG. 1 remain unbonded together. In this way the hollow fibre composite material laminate can be fabricated by resin bonding, preferably in an autoclave under conditions of temperature and pressure, before the filling material is introduced into the hollow fibres of the plies 1 so that the filling material is not detrimentally affected by the autoclave treatment.

To enable access to be obtained to open ends of the hollow fibres in the laminate illustrated in FIGS. 1 and 2, it is necessary to treat edge regions such as 5, 6 of the laminate to expose unfilled hollow fibre ends 7. To this end it is necessary that the laminate edge treatment step includes dry cutting off edge regions 5 and 6 of the laminate in both unbonded interleaved areas 4 and bonded areas 3 to remove hollow fibre ends 7 filled with resin during the resin bonding, so as to leave cut edges on the laminate exposing open unfilled hollow fibre ends. The laminate cut edges are then ground and polished, for example with silicon carbide paper, in a liquid coolant, preferably water, to remove resin smeared over the open unfilled hollow fibre ends 7 by the dry cutting step.

The ground and polished laminate cut edges such as 5 and 6, and therewith the unbonded open unfilled hollow fibre ends in the areas 4, are ultrasonically cleaned in a liquid solvent, which preferably is dichloromethane with the cleaning preferably being carried out for a time in the range of from 20 minutes to two hours. The dichloromethane should be fresh with frequent changes to ensure minimum contamination by the cleaning residue. The cleaned laminate cut edges are then dried, for example, at substantially 90° C. for substantially ten minutes to remove solvent or water taken up during grinding, polishing and cleaning. The edge cutting starts the process of exposing the hollow fibre ends, the grinding exposes more fibres and the cleaning moves the debris produced by the cutting and grinding stages. This leaves the way for the hollow fibres to be filled through the exposed ends 8 shown in FIG. 2 of the accompanying drawings.

To enable access to the ground and cleaned open fibre ends 8, it is first necessary to separate the plies 1 at the non-stick film material 2 in the unbonded interleaved areas 4 as shown in FIG. 1. The plies 1, and thus the open ends 8 of the hollow fibres can be separated at the non-stick film 2 in any convenient way such as by splaying out the plies by means of pulling the plies apart by pulling the non-stick film material 2 apart. Thus in the splayed out separated position as shown in FIG. 2 of the accompanying drawings, the open ends of the fibres in the plies 1 can be filled individually in any convenient way with one or more filling materials. Suitable filling materials are in liquid powder and/or particulate form. These filler materials can be pumped or otherwise introduced into the hollow fibres under pressure or the hollow fibres immersed in the liquids if a liquid form of filler material is used and allowed to fill by capilliary action or gravity. Such fill or filling materials are chosen to have any desired properties or characteristics different from that of the hollow fibre material. Other suitable filling techniques are vacuum filling or in-situ reaction depending on the exact material required within the hollow fibres.

The method of the present invention is suitable for producing a filled hollow fibre composite material with many applications depending upon the properties of the filling material chosen. Such filling material allows the properties of the composite material to be changed consistently through the composite material.

What is claimed is:

1. A method for manufacturing a filled hollow fibre composite material including the steps of laying up a plurality of prepreg plies of hollow fibre composite material and non-stick film material one on top of another with the non-stick film material interleaving successive plies at selected areas thereof, treating the laid up interleaved plies to resin bond together the ply areas not interleaved with the non-stick film material to form a hollow fibre composite material laminate in which the interleaved areas remain unbonded together, treating edge regions of the laminate to expose open unfilled hollow fibre ends, separating the plies at the non-stick film material in the unbonded interleaved areas to provide access to the open hollow fibre ends in each ply and, introducing a film material or materials having desired properties different from that of the hollow fibre material, into the hollow fibres through the open hollow fibre ends in one or more of the separated plies in the unbonded interleaved areas to form a filled hollow fibre composite material.

2. A method according to claim 1, in which the resin bonding treatment step is effected in an autoclave.

3. A method according to claim 1, in which the laminate edge region treatment step includes dry cutting off edge regions of the laminate in both unbonded interleaved areas and bonded areas to remove hollow fibre ends filled with resin during the resin bonding to leave cut edges on laminate exposing open unfilled hollow fibre ends, grinding and polishing the laminate cut edges in a liquid coolant to remove resin smeared over the open unfilled hollow fibre ends by the dry cutting, ultasonically cleaning the ground and polished laminate cut edges and there with the open unfilled hollow fibre ends, in a liquid solvent and drying the cleaned laminate cut edges.

4. A method according to claim 1, in which the hollow fibre composite material utilised is a resin bonded ply of hollow glass or carbon fibres.

5. A method according to claim 1, in which the non-stick film material utilised is a sheet of plastics material coated with a release agent.

6. A method according to claim 1, in which the filler material utilised is in liquid, powder and/or particulate form.

7. A method according to claim 3, in which grinding and polishing is carried out with silicon carbide paper.

8. A method according to claim 7, in which the liquid coolant utilised in grinding and polishing is water.

9. A method according to claim 3, in which the liquid solvent utilised in ultrasonic cleaning is dichloromethane.

10. A method according to claim 3, in which ultrasonic cleaning is carried out for a time in the range of from 20 minutes to two hours.

11. A method according to claim 3, in which drying is carried out at substantially 90° C. for substantially ten minutes.

* * * * *